Oct. 8, 1963  A. HARDY  3,106,107
TRANSMISSION

Filed May 1, 1961  2 Sheets-Sheet 1

INVENTOR.
Alexander Hardy
BY
Hugh L. Fisher
ATTORNEY

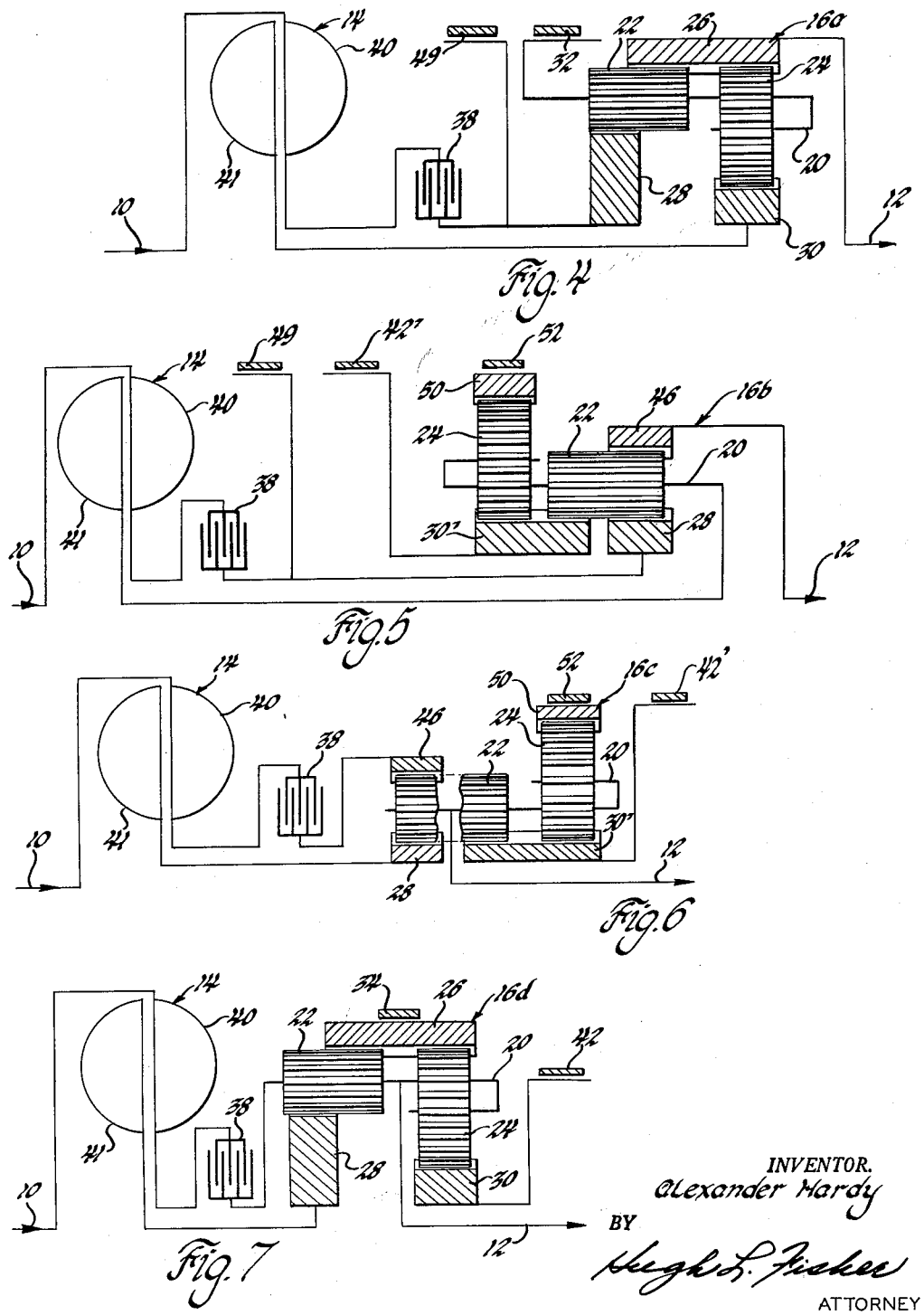

United States Patent Office 3,106,107
Patented Oct. 8, 1963

3,106,107
TRANSMISSION
Alexander Hardy, Detroit, Mich., assignor to General
Motors Corporation, Detroit, Mich., a corporation of
Delaware
Filed May 1, 1961, Ser. No. 106,691
18 Claims. (Cl. 74—688)

This invention relates to improvements in power transmissions.

In general, planetary type gearing is preferred in automatic transmissions because this gearing requires a minimum of space but still affords a maximum number of drive ratios. With a simple planetary gearset and as is well known, the braking of the appropriate element can produce an overdrive or an underdrive ratio. Also, the clutching together of two of the gearset elements will provide a direct drive ratio.

But, where more than two underdrive or overdrive ratios are required, additional gearsets are needed and this increases the space requirements as well as the complexity since additional brakes and clutches are demanded. Sometimes, compounding of the planetary gearing offers a partial solution to the problem since additional ratio coverage can be obtained without a substantial increase in the space requirements; however, this is often impractical since undesired loading as well as excessive pinion speeds can result, either or both of which reduce the life of the gearing and increase the gear noise.

For these reasons, the invention contemplates a novel transmission that is particularly suitable for incorporating a new and uncomplicated gearing arrangement capable of affording a maximum number of gear ratios with a minimum number of gears.

More specifically, the invention provides planetary gearing requiring a single planet carrier on which is revolvably mounted a pair of independently rotatable planet pinions, thereby enabling the gearing to be re-arranged for many diverse applications in each of which several reduced drive and overdrive ratios as well as a direct drive ratio are available.

Also, it is proposed by the invention to interchange and combine functions of various elements of the planetary gearing so as to further facilitate the attainment of maximum drive ratio coverage.

The foregoing and other objects and advantages of the invention will be apparent from the following description and from the accompanying drawings in which:

FIGURES 4 and 5 show schematically the gearing arranged so as to have the ring gear as the output; and FIGURES 6 and 7 depict schematically the gearing arranged so as to have the planet carrier as the output.

Figure 1:
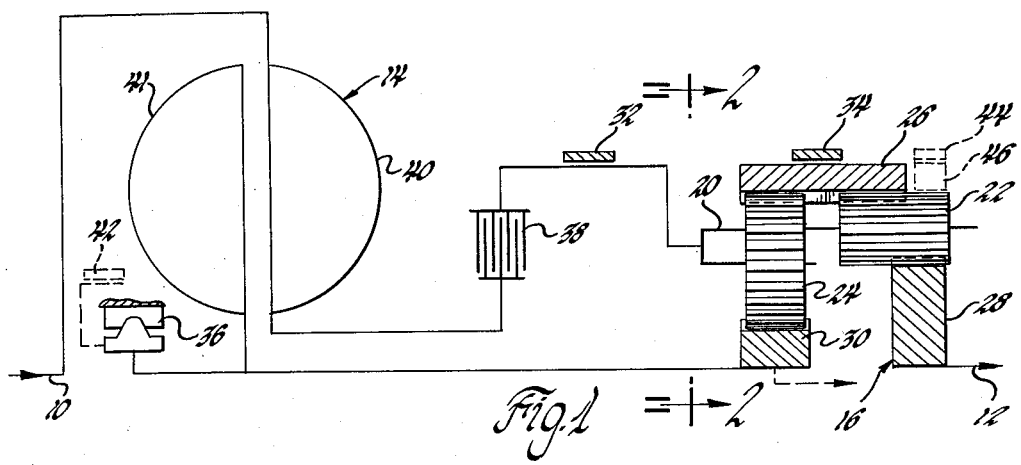
FIGURE 1 depicts schematically a transmission incorporating the principles of the invention.

Referring now to the drawings in detail, and particularly to the FIGURE 1 transmission, the numerals 10 and 12 designate respectively the input and output shaft for the transmission. Between these two shafts 10 and 12 there is a hydrodynamic torque transmitting device such as a fluid coupling 14 and planetary gearing 16. The transmission, as will become apparent, is particularly suited for the planetary gearing 16 and permits five or more forward ratios to be obtained.

Figure 2:
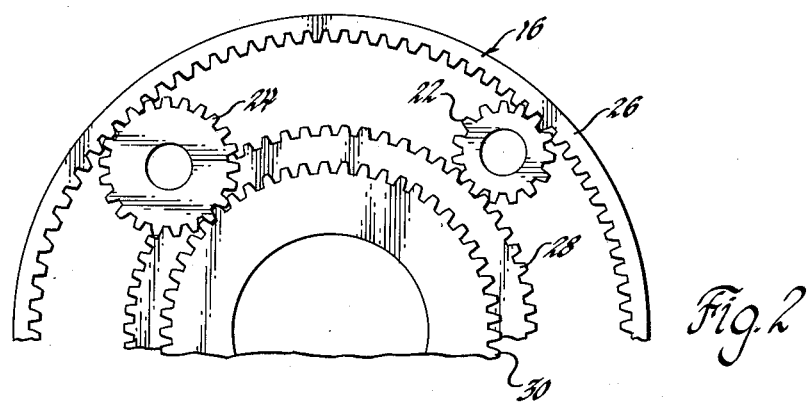
FIGURE 2 is a view of the planetary gearing in the FIGURE 1 transmission looking in the direction of arrows 2—2 and illustrating the disposition of the planet pinions therefor.

Considering the individual elements of the gearing 16, the planet carrier denoted generally at 20 has a pair of planet pinions hereinafter referred to as long and short pinions 22 and 24 revolvably mounted thereon in any known way. The number of long and short pinions 22 and 24 utilized will of course be determined by the application of the gearing 16. The long and short pinions 22 and 24, as best illustrated in FIGURE 2, are spaced apart from each other so as to have independent rotation. The gearing 16 also includes a ring gear 26 that meshes with both of the pinions 22 and 24, a sun gear 28 that meshes only with the long pinion 22, and a sun gear 30 that meshes only with the short pinion 24.

Ratio changing mechanism for rendering the gearing 16 effective to provide different drive ratios includes a planet carrier brake 32, a ring gear brake 34, a sun gear one-way brake 36, and a direct drive clutch 38. The one-way brake 36 may be of any known type employing sprags, roller, or other type one-way elements interposed between two races so as to prevent relative rotation therebetween in one direction, whereas the brakes 32 and 34 may be of any suitable kind, e.g., employ a band or disks. The other brakes 32 and 34 and the direct drive clutch 38 may be actuated in a customary manner, e.g., electrically, mechanically, or hydraulically, and in a sequence to be explained.

As mentioned, the FIGURE 1 transmission can afford a minimum of five forward drive ratios. Assuming that the sun gear 28 has substantially more teeth than the sun gear 30, then in first speed, i.e., the ratio affording the greatest torque multiplication, the fluid coupling 14 is filled, the carrier brake 32 engaged, and both direct drive clutch 38 and the ring gear brake 34 are disengaged. Consequently, drive proceeds from the input shaft 10, which customarily will be connected to a vehicle engine (not shown), through the fluid coupling 14 and to the sun gear 30. The transfer of drive through the coupling 14 is from an impeller 40 via the fluid medium to a turbine 41. With the carrier 20 held by the planet carrier brake 32, the sun gear 28 will be revolved and accordingly the output shaft 12 at a reduced speed, as compared to the speed of the input shaft 10. The output shaft 12 will be drive connected to the vehicle wheels in the usual way.

In second speed, the coupling 14 is drained and only the direct drive clutch 38 is engaged. The engagement of the direct drive clutch 38 transfers the drive from the input shaft 10 directly to the planet carrier 20, whereupon the sun gear 30 will become the reactor since it will be prevented from reverse rotation by the one-way brake 36. Now the sun gear 28 will revolve the output shaft 12 at a slightly faster speed.

To establish third speed, the coupling 14 is again filled and only the ring gear brake 34 is engaged, the direct drive clutch 38 having been disengaged. This causes the drive to again be transferred through the coupling 14 and to the sun gear 30. This drive being in a forward direction as in first speed will produce a release of the one-way brake 36 and will revolve the sun gear 28 and accordingly the output shaft 12 at a still faster speed than in second speed but still slower than the speed of the input shaft 10.

The fourth speed ratio with the FIGURE 1 transmission is a direct drive and requires only that the ring gear brake 34 be disengaged and the direct drive clutch 38 engaged. As will be noted, with both the coupling 14 and the direct drive clutch 38 engaged, the planet carrier 20 and the sun gear 30 are revolved at substantially the same speed, a slight difference being due to the inherent slip within the coupling 14. With the two elements of the gearing 16 revolving at substantially the same speed, the gearing 16 will become locked up and the sun gear 28 will revolve the output shaft 12 at nearly the same speed as the input shaft 10.

In the fifth speed, an overdrive ratio is obtained by applying the ring bear brake 34 and draining the coupling 14 with clutch 38 engaged so that the drive from the input shaft 10 is to the planet carrier 20. With the planet carrier 20 performing as the input and the ring gear 26 held stationary, the sun gear 28 will revolve the output shaft 12 at a faster speed than the input shaft 10.

Figure 3:
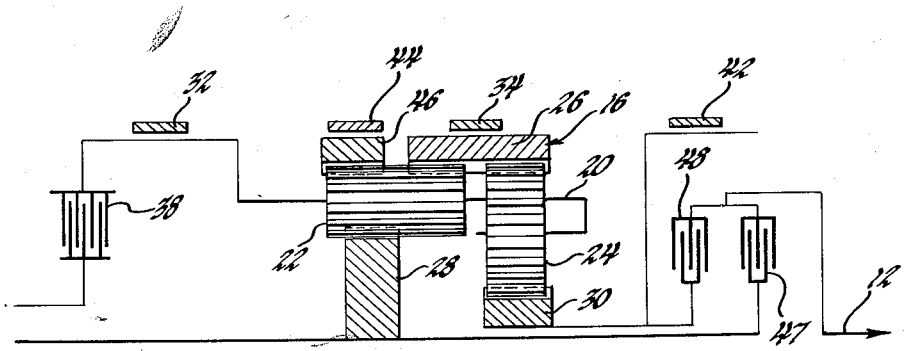
FIGURE 3 shows schematically a rearrangement of the FIGURE 1 gearing.

In FIGURE 3, the gearing 16 has been rearranged and additions made so as to illustrate its versatility. These same additions when included in the FIGURE 1 transmission as shown by the broken lines will enable the transmission to afford even greater ratio coverage. The added parts include a brake 42 that prevents the sun gear 30 from revolving in either direction, and a brake 44 that prevents rotation of a newly added ring gear 46, which in this arrangement meshes with the long pinion 22 and which will have a number of teeth thereon different from the ring gear 26, this being accomplished in a known way by cutting both gears 46 and 26 from gear blanks that have the same general characteristics. From these additions, two underdrive and three overdrive ratios are possible with the FIGURE 3 gearing, whereas in the FIGURE 1 transmission these ratios are in addition to those previously described.

One of these underdrive ratios is achieved in the FIGURE 1 transmission by emptying the coupling 14 and applying the direct drive clutch 38 so that the drive is to the planet carrier 20. In the FIGURE 3 gearing arrangement, it can be assumed that drive is transferred to the carrier 20 via clutch 38 in the same way or any other desired fashion. Reaction is provided by the engagement of the brake 42 so as to hold the sun gear 30. With the sun gear 28 serving as an output, it will be rotated somewhat slower than the input shaft 10.

The second speed ratio is made available with the planet carrier 20 still performing as the input in either the FIGURE 1 transmission or the FIGURE 3 gearing, but now only the brake 34 is engaged. This results in the sun gear 28 still revolving the output shaft 12 at a reduced speed.

The first overdrive ratio is achieved by engaging the brake 44 so as to hold ring gear 46. Again, assuming that the planet carrier 20 is serving as input and the sun gear 28 as an output, the output shaft 12 will be revolved at an increased speed.

The other two overdrive ratios obtainable with the FIGURE 3 transmission both require that the coupling 14 be filled so that the sun gear 28 becomes the input to the gearing 16 and the sun gear 30 serves as an output. With the FIGURE 3 gearing, the sun gear 28 can be driven in whatever way is preferred. Because of the desire in the FIGURE 3 gearing for both the sun gear 28 and the sun gear 30 to be at different times connected to the output shaft 12, clutches 47 and 48 are suggested. The clutch 47 would be employed to join the sun gear 28 to the output shaft 12, and the clutch 48 would join the sun gear 30 to the output shaft 12. One of the overdrive ratios would then be obtained by engaging only the brake 34, all other brakes as well as the clutch 38 being disengaged. The other overdrive ratio would result when the brake 32 was engaged, assuming of course that the brake 34 has been disengaged.

In FIGURE 4, another version of the gearing is denoted generally by the numeral 16a depicted and differs from gearing 16 in that the ring gear 26 is now connected to the output shaft 12. The parts in the FIGURE 4 construction similar to those in the FIGURES 1 and 3 arrangements are assigned the same numerals. If, with the FIGURE 4 arrangement the coupling 14 is filled and the direct drive clutch 38 disengaged so that drive is to the sun gear 30, the ring gear 26 will revolve the output shaft 12 backwards assuming the carrier 20 is restrained from rotation by the brake 32. Also, if a brake 49 is added and holds the sun gear 28 from rotation, and drive is still transferred to the sun gear 30, the output shaft 12 will be revolved backwards at a slightly different ratio thus permitting the FIGURE 4 arrangement to provide two reverse drive ratios.

As before, the direct drive clutch 38 once engaged at the time the coupling 14 is filled, assuming brakes 32 and 49 are disengaged, will result in a lock-up of the gearing 16a and a substantially direct drive will result between the input and output shafts 10 and 12.

The FIGURE 5 gearing is assigned the numeral 16b and, as with the FIGURE 4 gearing 16a, employs a ring gear output, in this instance ring gear 46. Again, the elements of the gearing, which are the same as those previously described, are assigned the same numerals, or if they are slightly different, the same numerals have a prime added. One of these gears, the sun gear 30', in this FIGURE 5 construction, meshes both with the long pinion 22 and the short pinion 24. Added to the gearing 16b is a ring gear 50 meshing only with the short pinion 24 and braked by a brake 52.

The gearing 16b can afford a direct drive, two overdrives, and a reverse drive. To establish the direct drive, only the direct drive clutch 38 need be engaged assuming that the coupling 14 has remained filled and that the brakes 42', 49 and 52 are all disengaged. This will lock up the gearing 16b since the sun gear 28 and the planet carrier 20 will be revolving at substantially the same speed.

One of these overdrives occurs when the coupling 14 is filled and the direct drive clutch 38 is disengaged so that drive is to the planet carrier 20. By holding the sun gear 28 with the brake 49, the ring gear 46 will revolve the output shaft 12 at a faster speed with respect to the input shaft 10. The other overdrive is obtained by engaging brake 42' so as to hold the sun gear 30', the other brakes 49 and 52 being disengaged and drive still being delivered to the planet carrier 20 from the input shaft 10 by the coupling 14. The sun gear 30' will require a number of teeth that is different from the number of teeth on the sun gear 28. Again, the ring gear 46 will revolve faster than the input shaft 10, and the relationship of this drive to that with the brake 49 engaged, will of course be determined by the gear ratios or the difference in the number of teeth on the two sun gears 30' and 28.

By emptying the coupling 14 and transferring drive from the input shaft 10 through the direct drive clutch 38 to the sun gear 28, and by engaging the brake 52, the ring gear 46 can be caused to revolve the output shaft 12 backwards. This enables the gearing 16b to also offer a reverse in addition to the other mentioned ratios.

The FIGURE 6 gearing has been assigned the numeral 16c and employs the carrier 20 as an output. Again, as previously mentioned, the parts that are similar to those discussed have been assigned the same numbers. This gearing 16c can provide three reduction drive ratios, a direct drive ratio, and a reverse drive ratio.

To establish a first reduced drive through the gearing 16c, the coupling 14 is filled so that drive is transferred to the sun gear 28 only.

Then, by holding the ring gear 50 with the brake 52, the carrier 20 will transfer drive to the output shaft 12.

In the second reduced drive ratio afforded by the gearing 16c, the coupling 14 remains filled so that drive is transferred to the sun gear 28, but only the sun gear 30' is held against rotation, this being due to the engagement of the brake 42'. Again, the sun gears 28 and 30' will have different numbers of teeth.

The third reduced drive ratio from the gearing 16c requires that the coupling 14 be emptied and a clutch 38 engaged. As a result, drive will proceed directly from the input shaft 10 to the ring gear 46 whereupon, with the sun gear 30' still held against rotation by the brake 42', the carrier 20 will be driven at the slower speed than the input shaft 10.

Direct drive only requires with the 16c gearing that both the coupling 14 be filled and the clutch 38 be engaged or remain engaged for shifting from the third underdrive ratio. Brakes 42' and 52 will be disengaged so that the gearing 16c will be locked up for the desired substantially 1:1 ratio between the input shaft 10 and the output shaft 12.

If again with the gearing 16c the coupling 14 is emptied, and drive is transferred from the input shaft 10 to the ring gear 46 and the ring gear 50 is held by the brake 52, the carrier 20 and accordingly the output shaft 12 will be revolved backwards relative to the input shaft 10.

The FIGURE 7 gearing 16d is very similar to the gearing 16c in FIGURE 6 since the carrier 20 is connected directly to the output shaft 12. There is a difference, however, inasmuch as the ring gear 26 is employed and meshes, as the gearing 16a, with both the long pinion 22 and the short pinion 24. A brake 34 holds this ring gear 26 so that with the input to the sun gear 28, assuming that the direct drive clutch 38 is disengaged, the output shaft 12 will be driven at a reduced speed relative to the input shaft 10. The direct drive ratio is obtained by engaging the direct drive clutch 38 with the coupling 14 filled or caused to be filled so that the carrier 20 and the sun gear 28 are revolved at substantially the same speed for a lock-up drive.

With the gearing 16d, an overdrive ratio can be achieved by engaging the brake 42 and by filling the coupling 14 while both the clutch 38 and the brake 34 are disengaged. As a result, the carrier 20 will revolve the output shaft 12 faster than the input shaft 10.

It should be kept in mind that the gear ratios desired with any of the described planetary gearing arrangements will be determined by the application of the gearing and these gear ratios can be easily changed by varying the tooth proportions in a manner well-known.

As now is apparent, the gearing affords a very substantial ratio coverage and also includes more than one reverse drive ratio so that the gearing is suited for heavy duty operation as well as for installations where fewer ratios are needed. The fact that the gearing can be compacted renders it very versatile in that it is adaptable for many diverse installations.

The invention is to be limited only by the following claims.

I claim:

1. Planetary gearing comprising, in combination, a planet carrier element having a pair of planet pinions journaled thereon, a plurality of gear elements including a sun gear and so arranged that one of the gear elements meshes with both planet pinions and another of the gear elements meshes with only one of the planet pinions, the planetary gearing being so arranged that with one of the elements serving as an input, another of the elements performing as a reactor, and the sun gear serving as an output, drive is transferred between the input and the output in a certain ratio.

2. Planetary gearing comprising, in combination, a planet carrier element having a pair of planet pinions supported thereon for independent rotation relative to each other, a plurality of gear elements so arranged that one of the elements meshes with both planet pinions and another of the elements with only one of the planet pinions, the plurality of gear elements including input and output sun gears, the gearing being so arranged that with one of the elements performing as a reactor, drive is transferred between the input and output sun gears in a certain ratio.

3. Planetary gearing comprising, in combination, a planet carrier element having a pair of planet pinions supported thereon for independent rotation relative to each other, a plurality of gear elements so arranged that one of the gear elements meshes with both planet pinions and another of the gear elements meshes with only one of the planet pinions, the plurality of gear elements including input and output sun gears, the planet carrier element being adapted to perform as a reactor for the gearing and render the gearing operative to transfer drive between the input and output sun gears in a certain ratio.

4. Planetary gearing comprising, in combination, a planet carrier element having a pair of planet pinions supported thereon for independent rotation relative to each other, a plurality of gear elements so arranged that one of the gear elements meshes with both planet pinions and another of the gear elements meshes with only one of the planet pinions, the gear elements including an input sun gear, an output sun gear, and a ring gear adapted to perform as a reactor for the gearing and thereby render the gearing operative to transfer drive between the input and output sun gears in a certain ratio.

5. Planetary gearing comprising, in combination, a planet carrier having a long and a short planet pinion supported thereon for independent rotation relative to each other, a ring gear meshing with both the short and the long pinions, an input sun gear meshing with one of the pinions and an output sun gear meshing with the other of the pinions, the ring gear being arranged to perform as a reactor for the gearing and thereby render the gearing operative to transfer drive between the input and output sun gears in a certain ratio.

6. Planetary gearing comprising, in combination, a planet carrier having long and short pinions revolvably supported thereon for independent rotation relative to each other, an input sun gear meshing with one of the pinions, an output sun gear meshing with the other of the pinions, a ring gear meshing with both of the pinions, the planet carrier being arranged to perform as a reactor for the gearing and thereby render the gearing operative to transfer drive between the input and output gears in a certain ratio.

7. Planetary gearing comprising, in combination, an input planet carrier having a pair of pinions revolvably supported thereon for independent rotation relative to each other, a plurality of gears so arranged that one gear meshes with both planet pinions and another of the gears meshes with only one of the planet pinions, the pluraltiy of gears including an output sun gear and a gear arranged so as to perform as a reactor for the gearing and thereby render the gearing operative to transfer drive between the input planet carrier and the output sun gear in a certain ratio.

8. Planetary gearing comprising, in combination, an input planet carrier having a pair of pinions revolvably supported thereon for independent rotation relative to each other, a plurality of gears so arranged that one gear meshes with both planet pinions and another of the gears meshes with only one of the planet pinions, the plurality of gears including an output sun gear and a reaction ring gear arranged so as to perform as a reactor for the gearing and thereby render the gearing operative to transfer drive between the input planet carrier and the output sun gear in a certain ratio.

9. Planetary gearing comprising, in combination, an input planet carrier having a pair of pinions revolvably supported thereon for independent rotation relative to each other, a plurality of gears so arranged that one gear meshes with both planet pinions and another of the gears meshes with only one of the planet pinions, the plurality of gears including an output sun gear and a sun gear arranged so as to perform as a reactor for the gearing and thereby render the gearing operative to transfer drive between the input planet carrier and the output sun gear in a certain ratio.

10. Planetary gearing comprising, in combination, an input planet carrier having journaled thereon long and short pinions for independent rotation relative to each other, a ring gear meshing with both planet pinions and an output sun gear meshing with only one of the planet pinions, the ring gear being adapted to perform as a reactor for the gearing and thereby render the gearing operative to transfer drive between the input planet carrier and the output sun gear in a certain drive ratio.

11. Planetary gearing comprising, in combination, an input planet carrier having a pair of pinions revolvably mounted thereon for independent rotation relative to each other, a plurality of gear elements including an output ring gear and so arranged that one of the gear elements meshes with both pinions and another of the gear elements meshes with only one of the pinions, the gearing being so arranged that with one of the elements performing as a reactor the gearing is operative to transfer drive between the input carrier and the output ring gear in a certain ratio.

12. Planetary gearing comprising, in combination, an input planet carrier having a pair of pinions revolvably mounted thereon for independent rotation relative to each other, a plurality of gears including ring and sun gears and so arranged that one gear meshes with both pinions and another gear meshes with only one of the pinions, a reaction sun gear meshing with both pinions, an output ring gear meshing with only one of the pinions, the gearing being arranged so that with the carrier performing as an input, the ring gear as an output and the sun gear as a reactor, drive is transferred between the input carrier and the output ring gear in a certain ratio.

13. Planetary gearing comprising, in combination, a planet carrier having long and short pinions revolvably mounted thereon for independent rotation relative to each other, a reaction sun gear meshing with the long pinion, a reaction sun gear meshing with both pinions, an output ring gear meshing with the long pinion, and an input sun gear meshing with the long pinion, means selectively operable to brake the reaction sun gears so that different drive ratios are provided by the gearing between the input sun gear and the output ring gear.

14. Planetary gearing comprising, in combination, an output planet carrier having a pair of pinions revolvably mounted thereon for independent rotation, a plurality of gear elements including a sun gear and so arranged that one of the gear elements meshes with both pinions and another of the gear elements meshes with only one pinion, the gearing being so arranged that with one of the gear elements serving as an input, the sun gear as a reactor, and the carrier as an output, drive is transferred between the input and the output carrier in a certain ratio.

15. Planetary gearing comprising, in combination, an output planet carrier having a pair of pinions revolvably mounted thereon for independent rotation, a reaction sun gear meshing with both pinions, an input gear meshing with only one of the pinions, the gearing being operative to transfer drive from the input gear to the output carrier in a certain drive ratio when the sun gear is performing as a reactor.

16. Planetary gearing comprising, in combination, an output planet carrier having a pair of pinions revolvably mounted thereon for independent rotation, a reaction ring gear meshing with both pinions, an input gear meshing with only one of the pinions, the gearing being operative to transfer drive from the input gear to the output carrier in a certain drive ratio when the ring gear is performing as a reactor.

17. Planetary gearing comprising, in combination, an output planet carrier having long and short pinions revolvably mounted thereon for independent rotation, a reaction ring gear meshing with both pinions, a reaction sun gear meshing with the short pinion, an input sun gear meshing with the long pinion, and means selectively operative to brake the reaction sun and ring gears so that different drive ratios are provided by the gearing between the input sun gear and the output carrier.

18. Planetary gearing comprising, in combination, an output planet carrier having long and short pinions revolvably mounted thereon for independent rotation, a reaction sun gear meshing with both pinions, a reaction ring gear meshing with the short pinion, an input gear meshing with the long pinion, and means selectively operable to brake the reaction sun and ring gears so that different drive ratios are provided by the gearing between the input gear and the output carrier.

References Cited in the file of this patent

UNITED STATES PATENTS

| | | |
|---|---|---|
| 2,402,164 | Kelbel | June 18, 1946 |
| 2,725,762 | Hettinger | Dec. 6, 1955 |
| 2,886,984 | Whelpley | May 19, 1959 |
| 3,021,727 | Kelley et al. | Feb. 20, 1962 |

FOREIGN PATENTS

| | | |
|---|---|---|
| 1,006,274 | France | Jan. 16, 1952 |